United States Patent

Johnston

[15] 3,707,668
[45] Dec. 26, 1972

[54] COMPOUND INVERTER OF VARIABLE OUTPUT VOLTAGE AND FREQUENCY

[72] Inventor: Gerald T. Johnston, Mahwah, N.J.

[73] Assignee: Precision Products Company, Hawthorne, N.J.

[22] Filed: Dec. 16, 1971

[21] Appl. No.: 208,563

[52] U.S. Cl. .................... 321/5, 321/27, 321/45 C
[51] Int. Cl. ................................................ H02m 7/48
[58] Field of Search ................ 321/5, 27, 45, 45 C

[56] References Cited

UNITED STATES PATENTS

| | | | |
|---|---|---|---|
| 3,262,036 | 7/1966 | Clarke et al. ............................ 321/5 |
| 3,336,520 | 8/1967 | Miyairi et al. .......................... 321/5 |
| 3,340,453 | 9/1967 | Bradley et al. ..................... 321/45 C |
| 3,391,327 | 7/1968 | Pelly .................................. 321/27 R |
| 3,555,397 | 1/1971 | Frank ................................ 321/45 C |
| 3,573,602 | 4/1971 | Jensen .............................. 321/27 R |
| 3,600,658 | 8/1971 | Kuniyashi ......................... 321/45 C |
| 3,628,126 | 12/1971 | Kawakami et al. ............... 321/45 C |
| 3,648,149 | 3/1972 | Brown et al. ........................... 321/5 |

Primary Examiner—William M. Shoop, Jr.
Attorney—Thomas M. Marshall

[57] ABSTRACT

Two polyphase thyristor bridges are both directly connected to the polyphase a.c. output terminals of an inverter. One operates at an adjustable d.c. input voltage that appears across an input storage capacitor, which is in series, at each of its terminals, with one of two pulsing capacitors respectively connecting to the poles of the inverter's d.c. supply. The other bridge has its d.c. input connected to the d.c. supply on each side by coupled inductor windings and serves to transfer energy to the adjustable voltage bridge by charging and discharging the pulsing capacitors, as well as to extinguish the thyristors of the latter bridge when required, and to furnish directly part of the load current. Control circuits include arrangements for comparison of the storage capacitor voltage with a controllable reference voltage in response to which energy transfer pulses alternately charging the pulsing capacitors one way and then the other are drawn from the d.c. supply to control the output voltage of the inverter, preferably as some function of the operating frequency. Refinements are shown to assure adequate charging of pulsing capacitors at high speed, lockup and short circuit tolerance or protection simplicity, and limitation of the peak pulsing capacitor voltage.

36 Claims, 12 Drawing Figures

INVENTOR.
GERALD T. JOHNSTON
BY
Thomas M Marshall
ATTORNEY

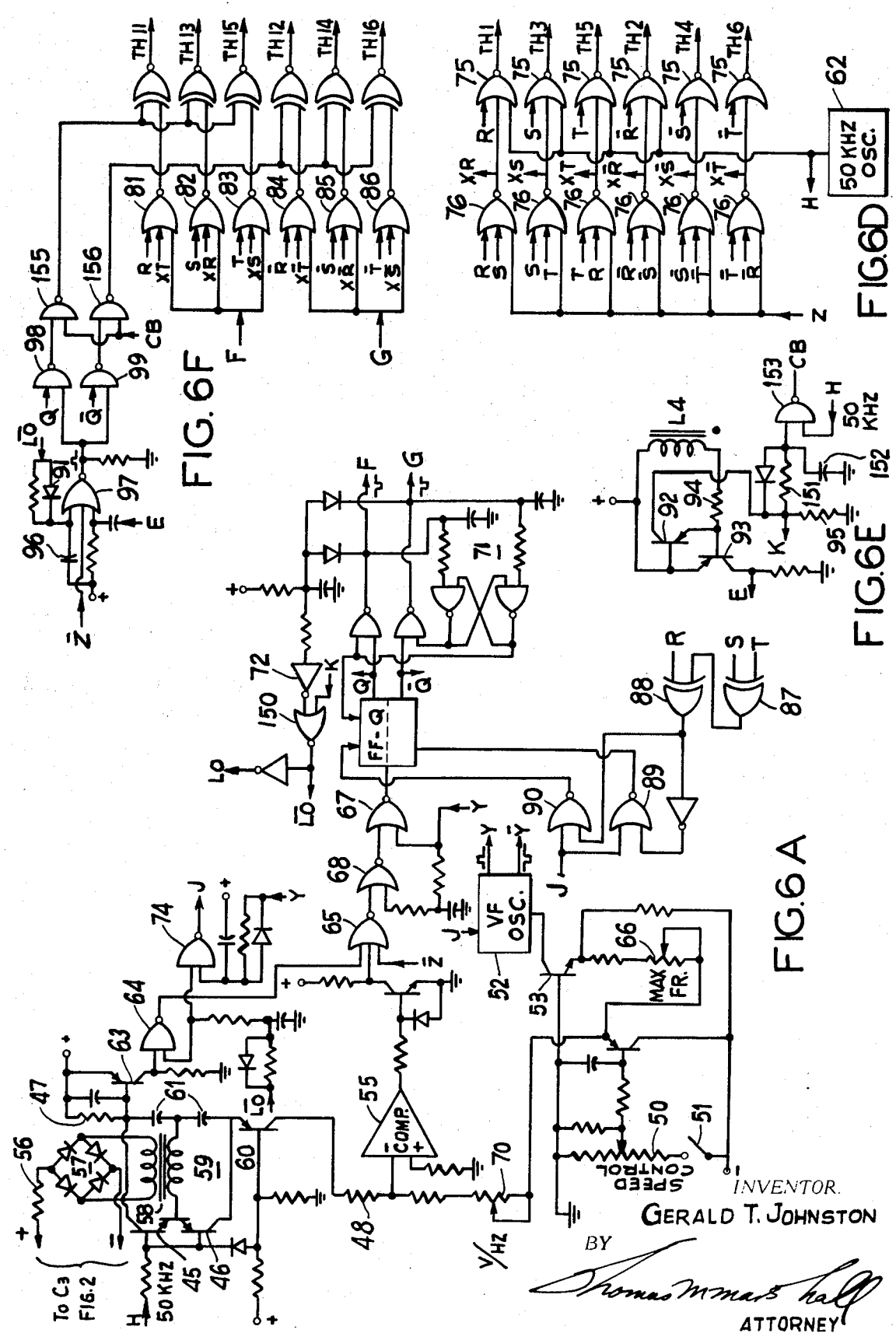

FIG. 4
|    | I | II | III | IV | V | VI |
|----|---|----|-----|----|----|----|
| R  | 1 | 2  | 2   | 2  | 1  | 1  |
| S  | 3 | 3  | 3   | 4  | 4  | 4  |
| T  | 6 | 6  | 5   | 5  | 5  | 6  |
| RS | — | ↗  | ↗   | —  | ↘  | ↘  |
| ST | ↙ | ↙  | —   | ↗  | ↗  | —  |
| TR | ↙ | —  | ↘   | ↘  | —  | ↙  |
FIG. 5
| | I | II | III | IV | V | VI | |
|---|---|---|---|---|---|---|---|
| | 40 | 40 | 40 | 40 | 40 | 40 | STEP OF CYCLE |
| A | 1 | 6 | 3 | 2 | 5 | 4 | TURNED OFF JUST BEFORE END |
| B | 6 | 3 | 2 | 5 | 4 | 1 | |
| C | 3 | 2 | 5 | 4 | 1 | 6 | GATED ON AT BEGINNING |
| | Y Z | Y Z | Y Z | Y Z | Y Z | Y Z | |
| D | 11 | 16 | 13 | 12 | 15 | 14 | TURNS OFF AV THYRISTOR |
| E | 11,13 | 16,12 | 13,15 | 12,14 | 15,11 | 14,16 | FIRST ⎱ ALT. POWER PULSES |
| F | 16 | 13 | 12 | 15 | 14 | 11 | LAST ⎰ |
| G | 15 | 14 | 11 | 16 | 13 | 12 | PULL-UP FOR ROW E PULSES |
| H | 12 | 15 | 14 | 11 | 16 | 13 | PULL-UP FOR ROW F PULSES |
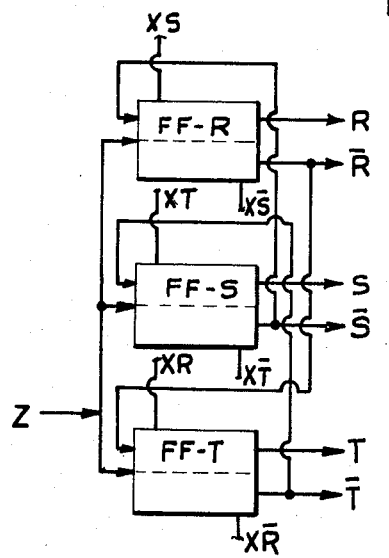
FIG. 6C
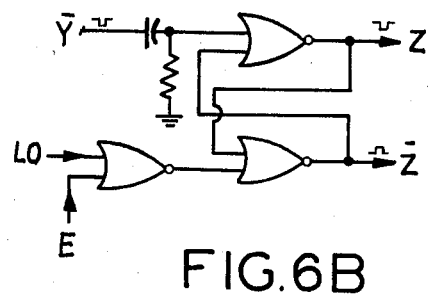
FIG. 6B
INVENTOR.
GERALD T. JOHNSTON
BY
Thomas M. Marshall
ATTORNEY

COMPOUND INVERTER OF VARIABLE OUTPUT VOLTAGE AND FREQUENCY

BACKGROUND OF THE INVENTION

Variable frequency inverters utilizing semiconductor controlled rectifiers (SCR), commonly referred to as thyristors, are increasingly employed to power polyphase alternating current motors, of either the induction or the synchronous type, driving various types of machinery. For the most satisfactory control of motor speed under varying starting and running loads, control of both output voltage and frequency is desirable. In many cases a control of both factors at once to maintain a volts per Herz ratio that is constant, except for a rise at the low frequency low voltage end of the control range, is particularly useful for many machinery driving applications.

Two methods have heretofore been most commonly used to control the output voltage of variable frequency inverters. The first is simply to vary the direct current voltage supplied to the inverter by some form of control ahead of the inverter, most commonly a phase-controlled rectifier, driven from the a.c. power mains and feeding the inverter through a filter. The phase-controlled rectifier method requires a separate rectifier for each motor speed control and provides undesirably increased ripple at lower output voltages.

The second commonly used method of controlling inverter output voltage is to superpose variable interruptions or reversals of current on the normal full power operation pattern of the inverter thyristor bridge, by means of a special control circuit in which duration and frequency of the resulting pulses can be varied. This is called pulse width modulation and requires a high pulsing frequency at low voltage in order to avoid excessive harmonic currents in the motor and usually involves rather careful tailoring of the control system to the motor requirements or vice versa.

In the various inverter circuits just mentioned not only must the thyristors of the inverter bridge be fired in the proper sequence by a suitable gating circuit, but provision must be made to turn off each thyristor in turn by a pulse of back voltage at the right time in order to prevent "lock-up" by a short-circuit across the d.c. input to the bridge.

One method of successively extinguishing the thyristors of the inverter is to interconnect reactances and diodes with the bridge thyristors in such a way as to generate and apply the turn-off pulses. U.S. Pat. No. 3,465,233 is an example of this method, which is commonly used when the inverter is operated off a variable d.c. supply. During operation at low d.c. input voltage, this system has a problem for providing sufficient off-commutation energy. It can be obtained by supplying d.c. from an independent source for off-commutation, but that involves providing a separate rectifier for each thyristor pair of the inverter.

In pulse width modulation systems off-commutation is commonly accomplished with an additional bridge of thyristors having the midpoint of each series pair connected through a capacitance, or a capacitance in series with an inductor, to the three output points, respectively of the inverter, as shown, for example in U. S. Pat. No. 3,207,974. That arrangement has the disadvantage of imposing on the off-commutating thyristors much steeper forward voltage transients (higher $dv/dt$) than are applied to the inverter thyristors. Furthermore, if as the result of some disturbance or malfunction both thyristors of any one of the six pairs of thyristors should be conducting at the same time and cause a lock-up, the circuit has nothing to limit current flow and fuses or circuit breakers must quickly act to protect the equipment. It is common to provide a fast-acting fuse in series with each individual thyristor.

OBJECTS OF THE INVENTION

The objects of this invention include: the provision of an inverter with variable output voltage and frequency that is operable of from a fixed voltage d.c. bus, is capable of operating an a.c. motor over a wide speed range with fast response time, can supply an output voltage waveform low in ripple content regardless of operating frequency and motor loading, is capable of operating into a short circuit on the output terminals without exceeding the rating of any of the components and can recover from misfiring of an inverter thyristor and continue to operate.

A further object is to accomplish the foregoing with a relatively low number of off-commutating capacitors and reactors, without the necessity of using fast turn-off thyristors.

SUMMARY DESCRIPTION OF THE INVENTION

As most briefly stated, this invention is realized by the provision of two inverter bridges both connected to the motor terminals or to a polyphase bus leading to a load that may be one or more motors. One of these bridges operates at adjustable voltage (AV) and usually supplies a portion of the power delivered to the motor. A storage capacitor is provided across its d.c. input. The other bridge has its d.c. input connected to the full voltage of the d.c. supply or bus through two coupled windings of an inductor, each of which connects one side of the d.c. input of this "full voltage" (FV) bridge to the d.c. supply or bus. The FV bridge functions to regulate the adjustable voltage input of the AV bridge, as well as to provide series L-C off-commutation for all thyristors, and to furnish power directly to the load. The AV bridge has its d.c. input reactively connected to the corresponding sides of the d.c. power supply by two pulsing capacitors respectively, these being accordingly in series with the storage capacitor. The thyristors of the AV bridge are continuously gated "on" for overlapping half cycles in a six step sequence, in the case of a three phase motor, and each is paralleled by a reverse-poled diode. As hereafter fully explained with reference to the drawings, during each 60° sequence step (referring to the controlled output frequency) certain thyristors of the FV inverter bridge are alternately pulsed, at intervals determined by a voltage set by the speed control to provide the desired level of volts per Herz (i.e., by whether the voltage across the storage capacitor is equal to or less than the voltage thus set). Such pulsing draws current through the series inductor of the FV bridge and charges one pulsing capacitor (alternately one then the other) to the supply voltage (or nearly thereto) while discharging the other pulsing capacitor. When this current exceeds the amount being drawn by the motor, the corresponding thyristor of the AV bridge is backbiased and current flows through its associated diode to charge the storage capacitor. A diode clamp arrangement, either a pair of cross connected diodes or a diode and a third winding on the inductor, may be used, if desired, to prevent the pulsing capacitor from being charged to unusually high voltage under certain conditions.

In particular, the thyristors of the FV bridge which are pulsed to recharge the storage capacitor as aforesaid are (1) either or both of those corresponding to the two thyristors of the same d.c. side of the AV bridge which are gated on during the particular steps of the cycle and (2) the one corresponding to the thyristor of the other d.c. side of the AV bridge that is also conducting during the same step of the cycle. Two successive operations occur at the end of each step of the cycle: (1) provision of an extra pulse if necessary to assure that the proper pulsing capacitor is charged and ready for the next operation and (2) provision of a pulse turning on only the thyristor of the FV bridge which corresponds to the thyristor of the AV bridge that is thereupon to be turned off (and the on-gating of which has, accordingly, just ceased). Current the thyristors of the FV bridge provides power to the motor, maintains the voltage of the storage capacitor at or near the level set by the control adjustment, in addition, performs the extinction function when required.

The full charging of the pulsing capacitors, which is important at high speed or under heavy load for assuring adequate off-commutation time, can be assured by providing a "pull-up" pulse on another thyristor of the FV bridge after the inductor has given up most of its stored energy. As explained more particularly below by reference to the drawings, the thyristor to be turned on to provide the pull-up pulse is another on the same d.c. side of the FV bridge as participated in the previous power pulse. Actually all thyristors of that side of the FV bridge can be turned on at this point: the proper one will furnish the shorter path and turning on the others does no harm at that moment. The effect is to continue the charging of the same pulsing capacitor, but this time by a path that does not go through the motor winding, hence quickly completing the charging of the pulsing capacitor. Furthermore, the thyristors of the FV bridge are effectively turned off as needed without any further circuitry, largely by virtue of the transfer of current from one winding of the inductor to the other.

With this system both the output voltage control and the turn-off pulsing is done with a minimum number of components most of which have multiple functions. The interposition of the series inductor windings and the pulsing capacitors between the respective inverter bridges and the d.c. supply automatically limits the current in case of a short circuit in the load, or a misfiring of a thyristor.

In fact, with a reasonable minimum inter-pulse interval for the full voltage bridge, a short circuit in the load or a lock-up of thyristors in the AV bridge can persist without causing the ratings of any components to be exceeded, allowing recovery from many short period misfirings without shutting off the inverter. The minimum interval between on-gating of the FV bridge thyristors can be increased or their gating can be temporarily blocked when the voltage across the storage capacitor is near zero to improve the current limiting in case of short circuit.

A lock-up in the FV bridge will be current-limited by the voltage drop of the series inductor only. Before the current builds up to damaging magnitude, however, a sensing circuit can be used to gate "on" all the thyristors of that bridge, splitting the current among them. A fuse or circuit breaker can then operate which may be set to operate on three times the maximum safe current for one thyristor, thus assuring that it will not operate on variations and surges of current normal to the operation of the system.

The chances of lock-up of the FV bridge from a thyristor misfire are small compared to those of a lock-up on the AV bridge in which three thyristors are on practically all of the time and any additional turning on of a thyristor produces a lock-up. If an FV bridge thyristor misfires, the chances are that the one between it and the other side of the d.c. supply will not go on before the misfired one recovers. Furthermore, if the misfire does short circuit the d.c. supply, the chances are high that one of the pulsing capacitors will be charged at the time, so that when the short circuit occurs, the thyristor turning on will cause a current from the charged pulsing capacitor to turn off the other thyristor of the short circuit pair. Hence in inverters of this invention a short circuit that shuts down the inverter and motor is rare, and when it occurs it is handled by the presence of a single ordinary fuse in the d.c. supply and such precautions as a fast acting fuse for each of the twelve thyristors are quite unnecessary.

DETAILED DESCRIPTION

The invention is best understood with respect to the annexed drawings in which:

FIG. 4 is a tabulation, partly diagramatic, showing a convention gating sequence in a three phase thyristor inverter and also the corresponding polarity of electromotive force between the output terminals;

Figure 2:
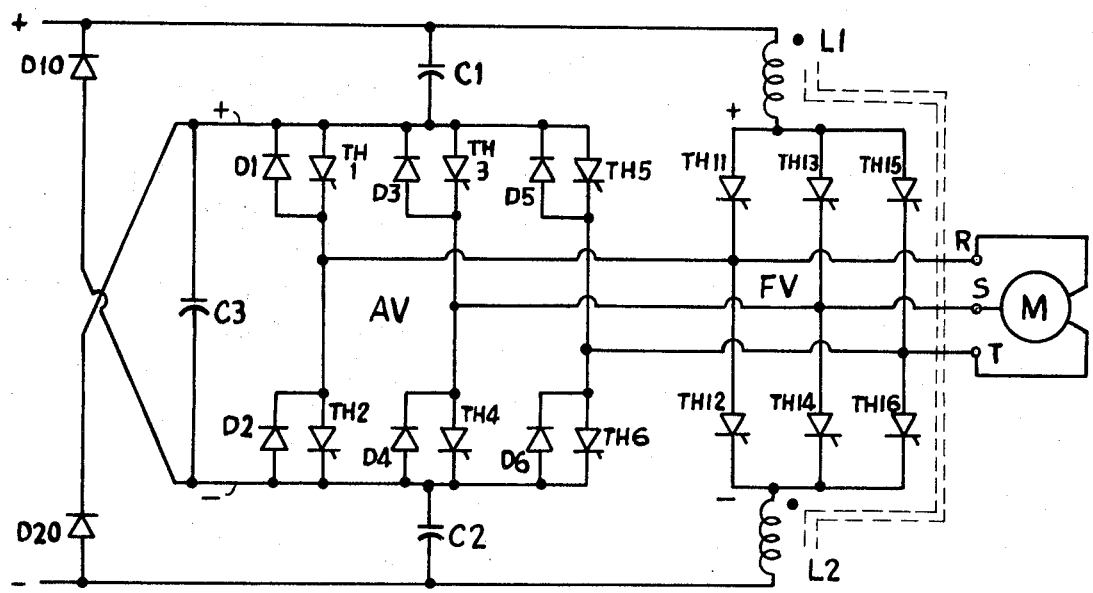
FIG. 2 is a circuit diagram of an inverter embodying the invention.
Figure 3:
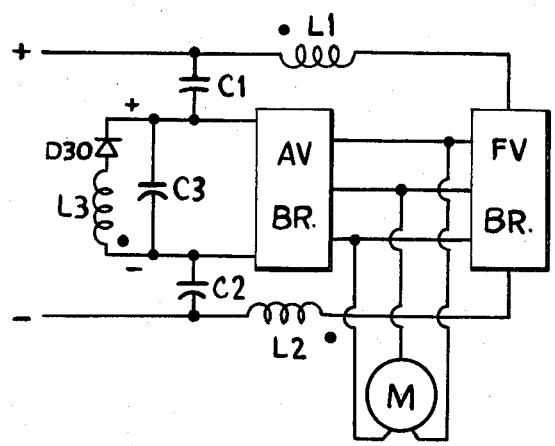
FIG. 3 is a diagram partly in block form of a circuit of another form of inverter embodying the invention.

FIG. 5 is a partly diagramatic tabulation showing the gating sequence of six of the thyristors in the circuits of FIG. 2 and 3 and indicating, for each of the 60° intervals, also the thyristors other than the aforesaid six which may be turned on during the 60° intervals in accordance with the invention; and FIG. 6 is a logic and circuit diagram made up of portions 6A, 6B, 6C, 6D, 6E and 6F disconnected for simplicity of illustration, but collectively referred to as FIG. 6, and illustrating a form of control circuit for use with the inverter shown in FIG. 2.

Figure 1:
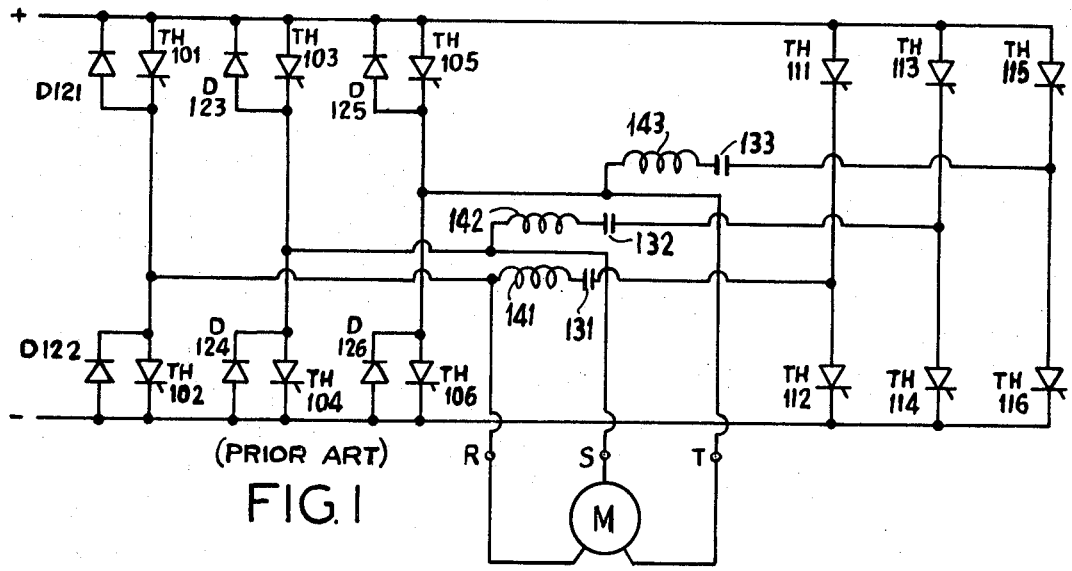
FIG. 1 is a circuit diagram of a prior art type of inverter.

FIG. 1 is a diagram of a prior art type of three-phase inverter, namely the circuit disclosed in FIG. 5 of U. S. Pat. No. 3,207,974, already mentioned above. This type of inverter has an extra set of thyristors for the purpose of off-commutation. The main inverter thyristors are disposed in the usual three pairs. TH101 and TH102 both connect to output terminal R, TH103 and TH104 both connect to output terminal S, while TH105 and TH106 both connect to output terminal T. The auxiliary thyristors, sometimes referred to as commutation thyristors, are likewise arranged in a three-phase bridge and are correspondingly numbered, TH111, TH112 . . . TH116, but instead of connecting to the output terminals R, S and T they connect to capacitors 131, 132 and 133.

The thyristors designated by odd numbers have their anodes connected to the positive side of the d.c. input of the inverter, while the even numbered thyristors have their cathodes connected to the negative side of the d.c. input. Clamping diodes D121, D122 . . . D126 are each poled inversely to the associated thyristor (TH101, TH102 . . . TH106 respectively) which it shunts for clamping purposes. Capacitors 131, 132 and 133 are connected respectively to output terminals R, S and T through series inductors 141, 142 and 143.

A control circuit (not shown) provides pulses to maintain thyristors TH101, TH102 . . . TH106 continuously gated on for overlapping period of substantially 180° in the usual six step cycle. FIG. 4 is a tabulation in which the column designate the 60° intervals or steps of the inverter cycle. As here defined each such step beings with the turning on of one of the six thyristors TH101, TH102 . . . TH106 and ends after the turning off of another thyristor. In the case of column I the step begins with turning on of TH103, and ends with the turning off of TH101. It is necessary to stop the on-gating signal of TH101 a little before TH102 is turned on in order to assure the success of the turn-off of TH101 by the procedure described below. The thyristors gated on during each step are designated by the numbers in each column, for example namely 1, 3 and 6, in column I. These numbers are the last digits of the thyristor designations, hence for step I they represent TH101, TH103 and TH106 of FIG. 1. The letter designation at the left of each row of numbers in FIG. 4 indicates the output terminal to which the thyristors designated in that row are connected.

The last three rows in the tubulation of FIG. 4 show the output polarity between terminals during each step of the sequence. The horizontal dashes indicate that the two output terminals in question are connected with the same pole of the d.c. input. The arrows show which of the terminals of the pair designated at the left of the row is positive and which negative, for example in the bottom row in column I the arrow slanting down to the left indicates that the left hand member of the terminal pair TR is negative and the other is positive. All the arrows slant down because they refer to conventional current going from positive, indicated as up, to negative, indicated as down. FIG. 4 shows the control sequence when the motor M is being driven at full power and speed. At lower speeds, pulse width modulation, to reduce the power furnished, imposes additional polarity reversals within each step of the cycle.

In the circuit of FIG. 1, thyristors TH101 and TH112 are turned on simultaneously. Under those circumstances TH101 will not only conduct load current but will also supply a pulse of current to charge capacitor 131 through inductor 141 and thyristor TH112. When capacitor 131 is fully charged, thyristor TH112, which does not continue to be gated on as is TH101, will recover and resume its blocking state. When the on-gate applied to TH101 ends almost 180° later, action by the control circuit is required to stop the conduction of load current through TH101. To do this TH111 is then gated on and current will flow through TH111, capacitor 131, and inductor 141. The current is limited by the inductance and capacitance, so that it will be sinusoidal in wave form, with a constant time period. When this current exceeds the load current, thyristor TH101 will stop conducting the diode D121 will carry the excess current. TH101 will then be backbiased by the forward voltage drop of diode D121 long enough for it to recover. When the current drops below the current required by the motor M, thyristor TH101 will block, while the potential of output terminal R will change from positive to negative. Diode D122 will conduct the motor current in excess of the current carried by inductor 141 and capacitor 131. As the charge of capacitor 131 approaches the potential of the fixed voltage d.c. supply, inductor 141 will begin to give up its full energy by charging capacitor 131 to a still higher voltage. The voltage across inductor 141 will then collapse suddenly and thyristor TH111 will be backbiased. Thyristor TH102 is now gated on to carry the motor current and hold terminal R connected to the negative potential.

To transfer terminal R back to the positive potential of the d.c. supply three steps (180°) later, thyristor TH112 is then turned on to turn off thyristor TH102. It should be noted that a high rate of increase of forward voltage ($dv/dt$) exists across thyristor TH111 when thyristor TH112 switches on, since the two thyristors are directly in series with the d.c. supply voltage. The auxiliary or "commutating" thyristors TH111, TH112 . . . TH116 of FIG. 1 are connected to the output terminals of the inverter only through a short time period reactive circuit, serving to store energy in one connection and to release it for turning off an inverter thyristor in the other connection of the reactive circuit through a commutating thyristor. In this circuit there are three independent reactive circuits each interconnecting a pair of inverter thyristors and a pair of auxiliary of "commutating" thyristors.

A circuit diagram of an illustrative embodiment of the present invention is shown in FIG. 2. The input to the inverter is at the left with the two poles of the direct current supply, which operates at substantially fixed voltage, indicated by plus (+) and minus (−) signs respectively. The three phase a.c. output terminals are again identified by R, S and T and shown connected to the motor M, which is a typical load. In FIG. 2 there are two thyristor bridges, both having each of their three pairs of thyristors connected to a different output terminal. The thyristor bridge shown at the left operates at adjustable input voltage and the bridge shown at the right operates at the full voltage of the d.c. supply. The two bridges may for convenience be referred to as the adjustable voltage (AV) bridge and the full voltage (FV) bridge.

The thyristors of the AV bridge, TH1, TH2 . . . TH6, are respectively paralleled with reverse poled diodes D1, D2 . . . D6. The d.c. input to the AV bridge, its polarity again indicated by plus (+) and minus (−) signs, is connected the corresponding poles of the d.c. supply by series capacitors C1 and C2 respectively, which may be referred to functionally as pulsing capacitors. There are also clamp diodes D10 and D20 cross connected in normally blocking polarity between the d.c. input of the AV bridge and the d.c. supply.

The storage capacitor C3, of much greater capacitance than the pulsing capacitors C1 and C2, keeps the input voltage of the AV bridge relatively steady against short period fluctuation. It may, for example, have 10 times the capacitance of C1, but preferably it is of about 750 microfarads, while C1 and C2 may conveniently be of 5 microfarads each. The d.c. input of the FV bridge, again identified as to polarity on FIG. 2 by plus (+) and minus (−) signs, is connected to the corresponding poles of the d.c. supply of the inverter through separate inductor windings L1 and L2 that are preferably coupled, with the polarity as shown in FIG. 2 by the conventional dot symbol. These may be two windings on a single inductor core or they may be separate inductors coupled with a link winding. At low speeds the energy transfer made available by coupling is less important, so that for some applications independent inductors could be used. Indeed, for some low power purposes where power efficiency might be unimportant and equipment cost for some reason paramount, resistors might be used instead of inductor windings.

The numbering scheme for the thyristors explained in connection with FIG. 1 has been used in FIG. 2, this time without the "100" prefix. A control circuit of the kind shown in FIG. 6 gates thyristors TH1, TH2 . . . TH6 on continuously for overlapping half cycles in the manner described in connection with FIG. 4. This sequence is represented in rearranged form in the first three rows of the tabulation shown in FIG. 5, where row A identifies the thyristor that will be turned off just before the end of the 60° step identified by the column number, row B identifies the thyristor that is not switched either at the beginning or at the end of the step and row C identifies the thyristor which is gated on at the beginning of the step in question. The diagonal dashed line, accordingly, show the continued on-gating of the various thyristors. The shaded areas 40 represent the turn-off intervals for the respective thyristors identified by the number to the left.

Diodes D1, D2 . . . D6 are necessary to carry regenerative motor currents that may arise under certain conditions of operation of the motor M and thus prevent the motor voltage from becoming higher than the voltage on capacitor C3. They also serve to pass the excess current of the pulses that are provided by the turning on of the various thyristors of the FV bridge.

The regenerative motor currents, when they arise, will charge the capacitor C3 and increase the voltage across it. In applications where normal ratios of mechanical inertia to mechanical resistance are involved, this creates no problem. Regenerative currents can be reduced by increasing inverter frequency, but if dynamic braking is desired, a shunt resistor may be switched in when the voltage of C3 gets to 10 or 15 percent above the d.c. supply voltage. In the case of hoist motors it may, however, be desired to provide for some way of returning regenerated electrical energy to the d.c. supply, or even to an a.c. line from which the d.c. is derived, by one or another of the methods heretofore devised for the purposes of other inverter systems having limited d.c. storage.

In principle only one thyristor of the FV bridge conducts at a time, although it may be convenient to have two on the same d.c. side conduct in some cases. One of the functions served by the thyristors of the FV bridge is to transfer energy from the d.c. supply to the storage capacitor C3 whenever the voltage across the storage capacitor C3 falls below a reference voltage supplied by the control circuit described below, a condition which will continually occur during operation of the motor as it draws current from the AV bridge (not, of course, when the motor happens to be producing regenerative current of the kind just mentioned above). Consider, for example, the situation when the inverter of FIG. 2 is in step I identified in the tabulations of FIG. 5. Under these conditions, TH1, TH6 and TH3 are being supplied a continuous on-gating signal from the control circuit. When the voltage across storage capacitor C3 falls below the reference voltage set by the control circuit (illustrated in FIG. 6), the control circuit generates a signal that is applied to one or two FV bridge thyristors, selected by control logic according to which "step" is under way and according to which pulsing capacitor is charged, as more fully described below in connection with FIG. 6. In step I the thyristors of the FV bridge that will be turned on to charge a pulsing capacitor will be: (1) to charge C2, either or both of TH11 and TH13 and (2) to charge C1, TH16 alone. In step II, to charge C2, TH 13 will be turned on alone and to charge C1 either or both of TH16 and TH12 will be turned on. Rows E and F of FIG. 5 identify the power pulse thyristors of the FV bridge for all steps of the inverter cycle. Row E gives the identity of the thyristors pulsed for the first power pulse of the particular step and alternate power pulses thereafter during the step. In steps I, III and V the pulses just mentioned charge C2, whereas in steps II, IV and VI they charge C1. This follows from the state of the pulsing capacitors following the extinction pulse furnished to the AV bridge at the end (Z interval) of the previous step. Row F identifies the thyristor involved in the last power pulse of the step and in the power pulses inserted between those involving thyristors identified in Row E.

The turning on of TH11 in step I (with or without TH13 also) will cause current to flow from the positive pole of the fixed voltage d.c. supply, through inductor winding L1, TH11, terminal R, motor M, terminal T, TH6 and capacitor C2 back to the negative pole of the d.c. supply. The current is limited by the building up of the field in the series inductor and by the charging of capacitor C2, so that it will be sinusoidal in wave form, with its time period always the same regardless whether the turning on of TH11 occurs just after C2 was discharged or a long time later. As the current of the sinusoidal pulse just described rises, at some instant it will exceed the requirement of the motor M, at which time thyristor TH1 will stop conducting (since its contribution to motor M is no longer needed) and the excess current will flow through diode D1 to charge capacitor C3 a small amount. During this time pulsing capacitor C2 is charging rapidly and capacitor C1 is caused to discharge a like amount through inductor winding L1, thyristor TH11 and Diode D1, increasing the energy storage in the inductor.

When capacitor C2 is charged up to the voltage of the fixed d.c. supply, diode D10 conducts, clamping the voltage on C2. This ends the drawing of current from the fixed voltage d.c. supply and current now flows through D10, L1, TH11, motor M and TH6 as well as through the parallel path from TH11 through D1 and C3. Since the inductor winding L1 must supply current at a potential equal to the potential on capacitor C3, it gives up stored energy, and the current just described decays linearly to zero in a short period of time. TH11 then recovers the blocking state and TH1, which is still being gated on, conducts again to supply motor current from C3.

The next time the depletion of charge on C3 requires a pulse to raise the voltage across C3 again, the control logic will turn on TH16. In this case current will flow from the positive pole of the fixed voltage d.c. supply through C1, TH1, TH3, into motor M (by terminal R in the case of TH1 and terminal S in the case of TH3) and out through terminal T, then TH16 and finally inductor winding L2 to the negative pole of the d.c. supply. Again, the current in excess of the motor requirements goes to increase the charge of capacitor C3. When C1 is charged to the voltage of the d.c. supply, diode D20 clamps the voltage on C1.

The function of clamping diodes D10 and D20 is not strictly necessary, for if they are not provided, the pulsing capacitors may be charged to voltages higher than the d.c. supply voltage, a condition that could be tolerated by the system, although the pulses would sometimes be unnecessarily large and the effect would vary with some operating conditions and would result in less uniformity of pulsing.

After the end of step I it is necessary to turn off TH1 and, as soon as it can safely be done thereafter, to turn on TH2. This must be done by turning on TH11, but the operation cannot succeed unless C1, rather than C2, is charged when TH11 fires. Hence an interval "Y" at the end of each step (shown set off by vertical dotted lines in FIG. 5) is established, during which the drawing of power pulses in response to the condition of C3 is inhibited and control logic (described below in connection with FIG. 6) determines whether an additional firing of TH16 is necessary to charge C2 and, if so, fires TH16 during the aforesaid interval, regardless of the voltage across C3.

The "Y" interval is followed by the "Z" interval which is the terminal portion of the step. During the "Z" interval all other firing of FV bridge thyristors is inhibited so that the turn-off pulse for the AV bridge can be produced without interference. In step I this function requires firing TH11 alone during the Z interval. When that happens, current flows from the d.c. supply, through inductor winding L1, TH11, motor M, TH6 and C2 back to the d.c. supply, thus charging C2. Concurrently, capacitor C1 is discharged through L1 and TH11. When the instantaneous current exceeds the requirements of the motor, TH1 stops conducting and the excess current flows through D1 to charge C3. TH1 is thus backbiased by the forward voltage drop of D1 during the interval in which the current in L1 exceeds the motor current. It is an important feature of this invention that the magnitude of this current is independent of the output voltage or load impedance and depends upon the impedance of L1, C1, C2 and the fixed voltage d.c. supply. An additional advantage is that the peak current flowing in L1 is twice as much as that being drawn from the d.c. supply, because at this time capacitor C1, which was previously charged, is discharging through L1. Thus it is possible to supply ample turn off time to TH1 as long as the motor currents do not exceed a magnitude which is close to twice the peak current drawn from the fixed voltage d.c. supply.

When the instantaneous current in L1 decays to less than the motor current, TH1 will block voltage and the motor current must be supplied by TH11. The current passes through L1, TH11, motor M, TH6 and D10. During this time L1 is giving up stored energy and the voltage supplied to the motor M across terminals R and T decays. Diode D2 then supplies the motor current in excess of the current in L1. The gating on of TH2 is initiated at this time without causing any appreciable voltage change in the circuit. The current in L1 decays slowly since the potential across L1 is low. The inductor current flow is L1, TH11, TH2 and D10.

After step II begins, the thyristors of the FV bridge that will be turned on next will be TH16 and TH12 together, since these play the same role in step II as TH11 and TH13 played in step I, as shown in Row E of FIG. 5. It is to be understood that either or both of these thyristors could be used for this purpose, but it is convenient to use both, since there is no additional complexity in control logic and the resistance of the charging path of the pulsing capacitors is reduced (if only one thyristor were to be fired, TH16 would be preferred, since it must be used anyway at the end of the step, to extinguish TH6).

The first time TH16 and TH12 are turned on during step II, TH11 may still be conducting as a result of the slow decay of currents in inductor L1. If so, however, when TH16 and TH12 are gated on, the d.c. supply voltage will appear across inductor winding L2 and, because of the coupling of the inductor windings, an equal voltage will be induced in inductor L1, which will backbias TH11 and turn it off. The current that was flowing in the inductor winding L1 is then transferred to inductor winding L2 where it combines with the current resulting from turning on thyristors TH16 and TH12. Since the turning on of thyristors of the FV bridge is applied alternately, first to one or two on one d.c. side of the bridge and then to one or two on the other side of the bridge, one of these operations is able to turn off the FV bridge thyristor or thyristors turned on in the previous operation. Power pulses for charging C3 can therefore be caused to succeed each other in quick succession, increasing the load current capability. A minimum interval between these pulses is preferred, however, not because of power handling ability but rather in order to limit the current drawn in the case of a short circuit in the load circuit or a lockup in AV bridge, this serving to permit operations promptly to be resumed if the short circuit or lock-up quickly clears. The reciprocal turn-off characteristic of pairs of thyristors of the FV bridge is a feature that reduces possibility of lock-up as already mentioned above.

The pattern of activation of the thyristors of the FV bridge, as so far described, is sufficient for control of the voltage across storage capacitor C3 between zero and the voltage of the d.c. supply, while also providing the necessary turn-off pulses to the AV bridge. It is possible to provide supplemental pulsing of the FV bridge thyristors in a pattern that will make it possible to bring the voltage of capacitor C3 somewhat above the d.c. supply voltage even while supplying substantial load currents. Since this additional feature is based upon making sure that capacitors C1 and C2 will be fully charged even during high speed operation of the motor M, when the voltage across capacitor C3 is at or near the d.c. supply voltage, this feature also has the virtue of assuring that the turn-off pulses will not be any weaker when the motor is running fast than when it is running slow. Since this feature is not needed when the motor is going at low speed, it may be disabled in the low speed portion of the control range.

If C3 is charged to a voltage equal to that of the d.c. supply and C2 has just been charged to a voltage equal to that of the d.c. supply by a pulse triggered by firing of TH11 and TH13 together, C1 accordingly also bearing a charge as previously explained, then the subsequent turning on of TH16 will transfer the energy stored in capacitors C1 and C2 over a short period of time to inductor winding L2. Capacitor C1, after quickly discharging, charges the other way as C2 discharges. After the peak current is passed, inductor winding L2 gives up the energy stored in the inductor, while C1 charges towards the d.c. supply voltage. As a result of circuit losses, however, capacitor C1 will not be charged to the full voltage of the d.c. supply by the time conductor winding L2 has given up all of the available energy. (The energy drawn from the d.c. supply during this interval was delivered to the load and stored in capacitor C3). Likewise, on each successive firing of FV bridge thyristors the final charge of capacitors C1 or C2, as the case may be, will become smaller, and so will the amount of current draw from the d.c. supply. When the average current from the d.c. supply cannot be maintained equal to the motor current, then the voltage across capacitor C3 will decrease.

It is possible, however, to prevent the above described decay of charge on capacitors C1 and C2 and on capacitor C3 by gating an appropriate thyristor of the FV bridge at the time the inductor runs out of energy. For example, after the gating of TH16, and the emptying of energy from L2, the appropriate thyristor to turn on is TH12. When it is turned on, current will flow from the positive pole of the d.c. supply, charging C1 through TH1, TH12 and back to the negative pole of the d.c. supply. In the process, energy will be stored in the inductor by the current flowing through inductor winding L2, with the result that the current will decay slowly in the path: L2, diode D20, TH1 and TH12. When TH11 (whether or not together with TH13) is next turned on, TH16 will be turned off by the voltage induced in inductor winding L2, while the circulating current that was flowing in winding L2 will be transferred to inductor winding L1.

The cycle just described, involving the firing of TH12, started with pulsing capacitor C1 charged to the d.c. supply voltage, with some additional energy being stored in the inductor. The amount of current drawn from the d.c. supply on each power pulse will then not decrease, and indeed the voltage across capacitor C3 may be maintained higher than the d.c. supply voltage because of the storage and delivery of energy by the inductor. After a power pulse in which TH11 and TH13 are turned on, followed by the inductor winding L1 giving up all or most of the energy in the inductor, the proper thyristor to turn on for a "pull-up" pulse of the type just described is TH15.

It has already been mentioned that the provision of a minimum time interval between successive firings of FV bridge thyristors provides a convenient current limitation in case of a short circuit across the output terminals or a lock-up resulting from misfiring of a thyristor of the AV bridge. Additional protection can be obtained either by causing the time interval between firings of the FV bridge thyristors to be increased when the voltage across capacitor C3 is close to zero or else by temporarily blocking the firing of the FV bridge thyristors, except for AV bridge turn-off pulses, whenever the voltage across capacitor C3 is less than some small value, for example 5 percent of the d.c. supply voltage. This is because if after a cold start the first pulse fails to charge capacitor C3 to well over 5 percent (or even 10 percent) a condition exists which will prevent normal operation of the motor and its control. The same holds true, of course, if the voltage across capacitor C3 falls that low during operation of the motor on account of some malfunction.

The procedure of turning on all thyristors of the FV bridge when a lock-up occurs in FV bridge has already been mentioned, as well as the reasons why such a lock-up is much less likely to occur than a lock-up of the AV bridge. A lock-up in the FV bridge can be quickly sensed without the addition of many or costly components and caused to lock-up the entire bridge, thus setting a higher safe limit for fusing and obtaining more time for a fuse action (since the current may build up to three times as much in the inductor windings). Since both inductor windings are aiding and are mutually coupled, the resulting inductance is four times the single winding inductance. Hence a relatively inexpensive normal fuse is sufficient to protect the inverter. Circuits for the protective features described in the last two paragraphs are included in the control circuits illustrated in FIG. 6.

FIG. 3 shows a method of terminating the charging of C1 and C2 that can be used as an alternative instead of the clamping diodes D10 and D20. In this case the same inductor which has the windings L1 and L2 is provided with a third winding L3 which, in series with diode D30, is connected across storage capacitor C3. In this case diode D30 conducts when the voltage across L3 exceeds the voltage on capacitor C3, causing energy in the inductor to be drawn off into C3 and thus halting the charging of C1 or C2, while adding slightly to the potential across C3. The turns ratio of L3 to L1 and L2 can be adjusted so that, on the average, the charging of C1 or C2 is leveled off when the capacitor is charged to about the d.c. supply voltage, which means that at higher C3 voltages the charging of C1 and C2 could in principle exceed the line voltage substantially, but in fact at higher motor speeds there is a contrary tendency for C1 and C2 not to reach maximum charge, so that the combined effect is favorable, perhaps even allowing the pull-up pulse circuits to be dispensed with in some applications of the circuit of FIG. 3.

CONTROL CIRCUITS

A form of control circuit suitable for gating the thyristors of the AV and FV bridges in the inverter of FIG. 2 in accordance with the operating and sequences above described is shown diagrammatically in FIG. 6, which consists of diagrams respectively designated FIG. 6A, FIG. 6B, FIG. 6C, FIG. 6D, FIG. 6E and FIG. 6F, which together show the control circuits. The separate partial diagrams, with inputs and outputs designated by symbols to show connections between these six portions of the control circuits, obviates the necessity of showing interconnecting lines that tend to obscure the function of the circuit component subgroups.

FIG. 6A shows the preliminary stages of preparation of the control signals for passing on to subsequent logic circuits. In this illustrated example, the speed control is the potentiometer 50, the energization of which can be turned on and off by the switch 51. The speed control 50 controls the frequency of the variable oscillator 52, through a grounded base transistor stage 53, and also applies a voltage to the negative terminal of comparator 55, which may be an operational amplifier, through a resistor chain to the other end of which is provided a signal of opposite polarity proportional to the voltage across capacitor C3, furnished through a sensing circuit. The sensing circuit includes a series resistance 56, a diode bridge 57, a transformer 58 and detector circuit 59, which controls output transistor 60 and 63. In the detector circuit 59 a 50 kHz oscillator signal, derived from oscillator 62 of FIG. 6D, applies alternating voltage to transformer 58, by turning on transistors 45 and 46 on alternate half cycles. The two transistors draw current through the same winding of transformer but alternately in opposite directions, the current path in each case being completed by one of the capacitors 61. These currents flow in the same direction in the resistors 47 and 48. When C3 has no voltage across it very little current flows, just enough to excite the transformer, since the rectifying bridge 57 works into a very high impedance. When C3 is charged by operation of the inverter, a current proportional to the voltage across C3 will flow through high resistance resistor 56. This current will reduce the impedance of the diode bridge 57, causing them to conduct more each time they are switched on for a half cycle by the alternating current, with the result that the current drawn by transistors 45 and 46 on each half cycle will proportionally increase, and hence also the direct current in resistor 47 and through the emitter junction of transistor 60. Transistor 60 provides a signal to comparator 55 for measurement against the voltage set by speed control 50. A voltage developed across resistor 47 switches on transistor 63 when the voltage across C3 exceeds a desired minimum value.

The circuit just described deals with the following circumstance: the alternate charging of first one pulsing capacitor and then the other to the d.c. supply voltage, while the other pulsing capacitor discharges completely and recharges in the other direction to a voltage equal and opposite to that across C3, results in both terminals of C3 being oscillated together continually, back and forth in voltage steps of the magnitude of the sum of the d.c. supply voltage and the C3 voltage. For a measurement of the C3 voltage to be continually applied to the control circuits for comparison with a control voltage, it is necessary either to have all or a large part of the control circuits subjected to these large voltage oscillations, involving a safety hazard unless unusual insulation is provided at least to control 50 and switch 51, or else to have a measuring circuit that adequately isolates the measured circuit so that it can measure the relatively small variations of C3 voltage without interference from the large voltage pulses that repeatedly lift and drop the voltage of both terminals of C3 together. The circuit just described meets these requirements and has the advantage of using the same 50 kHz oscillator used for the purposes of FIG. 6E and FIG. 6F.

When the voltage of capacitor C3 is so low that the voltage applied to gate 64 by transistor 63 is below the threshold that gate 64 will recognize, gate 64 inhibits gate 65 and prevents the output of comparator 65 from effectively calling for any power pulses. In other words, gate 65 calls for a pulse only when all of its inputs are zero. The output of gate 64 is zero only when the output of transistor 63 is above gate 64's threshold and the "not lock-out" signal described further below is also present.

Oscillator 52 provides a single pulse per inverter cycle at the frequency determined by the setting of speed control 50 (and the speed range adjustment 66) and also provides an output which is the inverse of the previously mentioned output. The duration of the output pulse is for the length of the interval defined as "Y" in FIG. 5 and in the explanation relative thereto. Accordingly the outputs of oscillator 52 are designated as Y and $\overline{Y}$, following the usual digital logic convention. The signal Y directly inhibits gate 67 during the interval Y and with some delay, provided by a resistor-capacitance network, inhibits gate 68. When the signal Y goes back to zero at the end of the Y interval, the presence of the delayed Y pulse on gate 68 holds the output of the latter to zero, forcing a pulse out of gate 67 which advances flip-flop FF-Q to change its state and trigger a pulse during the Z interval (which follows the Y interval) which pulse, as further described below, serves to extinguish a thyristor of the AV bridge. The Y pulse acting on gate 67 also blocks signals from comparator 55 during the interval Y, which is reserved for determining whether an extra pulse is necessary, and if so applying such pulse, to assure that the proper pulsing capacitor will be charged at the beginning of the succeeding interval Z.

The interval Z is established by the circuit of FIG. 6B, which shows a flip-flop circuit which is set at the end of interval Y and reset by either of two signals to be discussed further below. The signal Z is zero during the interval Z and positive thereafter. $\overline{Z}$ is the inverse of signal Z, produced by the same circuit, as shown in FIG. 6B. Gate 65 is inhibited during the interval Z by a connection to output Z which is zero except during Z. The determination of whether thyristors of the positive or of the negative side of the FV thyristor bridge will be turned on is made by flip-flop FF-Q, which has two outputs Q and $\overline{Q}$, one the inverse of the other, and switches these from zero to positive and vice versa respectively each time it receives a positive signal from gate 67. These signals usually come from comparator 55, but during intervals Z they are generated by the delayed Y signal as mentioned above. Both the longer signals Q and $\overline{Q}$ and the briefer pulses F and G derived respectively from Q and Q furnished to the circuit of FIG. 6F. Pulses F and G may, for example, have a duration of 10 microseconds, as determined by the resistors and capacitors of flip-flop circuit 71. Both the F and G pulses are furnished through isolating diodes and a resistance capacitance network to an amplifier 72, which with the aforesaid network constitutes a timing circuit. The lengthened resulting pulse triggered by the 10 microsecond pulse generates a lock-out signal LO and its inverse $\overline{LO}$ which is adapted to be prolonged by another signal K to be described in connection with FIG. 6E. This lock-out signal defines the minimum interpulse interval (previously mentioned) for successive firings of FV bridge thyristors. The inverse $\overline{LO}$ of the lock-out signal is furnished to gate 64 where it is mixed with another lock-out signal already described. Either input to gate 64 can cause inhibition of gate 65. Signal $\overline{LO}$ is also furnished to gate 74 to create a signal J during the Y interval to assure that when extra pulse is fired during the Y interval for the purpose previously discussed, it will not start until the lock-out period is over. The signal J is also applied to oscillator 52 to cause the Y signal to overlap the normal $\overline{Y}$ signal (which is unchanged) under the conditions described.

As shown in FIG. 6C, flip-flops FF-R, FF-S and FF-T operate successively in each inverter cycle (when signal Z goes positive) to generate the six signals defining the on-gated time of the respective thyristors of the AV bridge. These signals are identified in FIG. 6 by the letter designation of the output terminal of the inverter and by polarity. They are provided to gate directly the outputs of which go to thyristors TH1, TH2 . . . TH6 via gates 75 of FIG. 6D and in certain combinations, respectively, to gates 76 of FIG. 6D, to which the Z signal is also provided, in order to generate an inhibiting signal for the particular one of the gates 75 during the Z period at the end of the last on step for the particular AV bridge thyristor. The R signal is zero during the on-gate time for TH1, and positive (logic "1") the rest of the time. The Z signal is zero during the "Z" interval. The resulting signals produced by gates 76 during the various Z intervals are designated XR, XS, XT, $\overline{XR}$, $\overline{XS}$ and $\overline{XT}$, respectively. In order to assure that the flip-flops of FIG. 6C begin operation in proper sequence, these flip-flops have XR, XS . . . $\overline{XT}$ signal connections to their set and reset terminals as shown in FIG. 6C. The XR, XS . . . $\overline{XT}$ signals are also furnished to gates 81, 82 . . . 86 in the special order shown in FIG. 6F in order to inhibit the firing of more than one FV bridge thyristor during the Z interval. The XR signal, for example, inhibits the firing of TH13 when TH11 is fired during the Z period that concludes step I, in order to turn off TH1.

In order to be sure that the thyristors of the AV bridge are continuously gated on so that when they are backbiased by regeneration currents or perhaps power pulses, they may come on again when these have passed away before the end of the signals R, S . . . $\overline{T}$ respectively, 50 kHz pulses are provided to gates 75 by oscillator 62.

As previously mentioned, the output signal of the flip-flop ring shown in FIG. 6C defines overlapping gates that, in each step of the inverter cycle, will continuously gate on two thyristors on one d.c. side of the AV bridge and one thyristor on the other d.c. side, as previously described in connection with the FIG. Since these thyristors of the AV bridge correspond to those of the FV bridge turned on for power pulses in the same step, as can be seen from FIG. 5, the six outputs of FIG. 6C are furnished to the respective gates 81, 82 . . . 86 of FIG. 6F in order for the proper power pulse thyristors to be turned on by the alternate applications of the short firing pulses F and G.

All that is needed to keep these alternations in proper polarity is the previously mentioned operation of determining whether an extra pulse needs to be provided during the Y interval at the end of every step. The latter function is accomplished by gates 87, 88, 89 and 90 of FIG. 6A. A pulse is forced on the set or reset connections of flip-flop FF-Q, as the case may be, at the time of the Y interval, as transmitted through the signal J from gate 74. If flip-flop FF-Q is not already in the correct position the pulse on the set or reset connection will set or reset the flip-flop but otherwise will not disturb it.

Inductor winding L4 shown in FIG. 6E with indication of polarity is an additional winding on the inductor of which L1 and L2 are other windings, hence coupled to the latter. L4 is a third winding in the case of FIG. 2 or a fourth winding in the case of FIG. 3.

L4 may conveniently have fewer turns than L1 or L2, since it operates into the low impedance, low power circuit shown in FIG. 6E, comprising transistors 92 and 93 and resistors 94, 95. Signal K appears between resistor 95 and ground so long as the inductor of which L4 is a winding is storing energy. When it begins to release energy as the charging current of the pulsing capacitors diminishes and especially when the AV thyristor which was temporarily backbiased resumes conduction, the current in L4 reverses and builds up a pulse in the other direction, which then decays. On this reversal signal K goes off and signal E appears, persisting until the inductor has given up substantially all its stored energy. In case of a lock-up in the FV bridge the signal K will persist instead of soon yielding to the E signal. That condition is detected by the delay provided by the network consisting of resistor 151 and capacitor 152 and the operation of gate 153 to form signal CB that locks up all FV bridge thyristors through gates 155 and 156 (FIG. 6F). The CB signal is modulated by the output of the 50 kHz oscillator 62 for long-duration gating of the thyristors.

In normal operation signal K has a duration fixed by the resonance half period of the inductance of inductor winding L1 or L2 and the capacitance of pulsing capacitors C1 and C2 in series, virtually unaffected by the time between power pulses or the C3 voltage. The signal E accordingly comes on at a predictable time in normal operation, so that in gate 97 of FIG. 6F the delay provided by the discharge time of capacitor 96 can assure that gate 97 will not be enabled by $\overline{LO}$ going to zero during the delayed lock-out period before signal E arrives. Gate 97 commands a pull-up pulse when signal E returns to zero before the lock-out period ends. There is no delay in the recharging of capacitor 96 because of the presence of diode 91. Gate 97 is inhibited during the Z interval by an input providing signal $\overline{Z}$, which is a positive pulse. When gate 97 operates, gates 98 and 99 provide for application of the pull-up pulse to the proper side of the FV bridge, by reference to signals Q and $\overline{Q}$ respectively.

At slow speed operation of motor M, when the inverter frequency and output voltage are both low, inductor winding L4 is slow in giving up the stored energy and signal E does not return to zero before the end of the lock-out period, so that in such cases no pull-up pulses are provided. This feature of blocking pull-up pulses under low speed conditions is not of importance for the inverter's power circuits, for the turning on of a thyristor when a pulse is not needed to charge a pulsing capacitor would do no harm and draw no current, but the feature may be useful for the more effective functioning or simpler design of a particular control circuit, as was found to be the case in the circuit illustrated in FIG. 6.

When the pull-up pulse is produced by the circuits above described and a pulsing capacitor is further charged in consequence, current will be drawn from the d.c. supply through a winding of the inductor and a voltage will be induced in L4, so that signal K will come on again. Signal K is provided to gate 150 so that the lock-out period will be extended under the conditions just described, until signal K disappears. It is not necessary to lock-out the succeeding power pulse during signal E because such pulse will involve only FV bridge thyristors connected to the other d.c. side of the bridge, which are therefore capable of turning off the thyristor involved in the previous pull-up pulse.

Signal E is, however, used to delay the end of the Z interval, as shown in FIG. 6B, in case signal E should overhang the end of the lock-out period produced by the pulse used to turn off a thyristor of the AV bridge. This assures that the next AV bridge thyristor to be gated on (by the circuit of FIG. 6C, when signal Z goes positive at the end of the Z interval) will go on without causing any appreciable voltage change in the circuit, even though the inductor winding current may decay slowly.

FIG. 6, including its various parts, FIGS. 6A, 6B, 6C, 6D, 6E and 6F, is only one illustrative embodiment of the various kinds of control circuits that may be used to meet the requirements of an inverter of this invention set forth above in connection with FIG. 2 and FIG. 5. Features of motor control heretofore used in connection with inverters may if desired be additionally incorporated in a control circuit for controlling an inverter according to this invention. A reversing arrangement can be provided, for example to the circuits of FIG. 6 which will interchange the firing sequences of thyristor pairs connected to two of the inverter output terminals. Provision for increasing the volts to Herz ratio of the output at the low frequency end of the control range could also be provided. For some applications features mentioned above in connection with the effect of regenerated currents fed to the inverter by a decelerating motor as the result of mechanical inertia may be incorporated in the control circuit. Such features include an increase of output frequency without increase of output voltage in response to regeneration or, in some cases, temporary application of a resistor leak or drain across capacitor C3 to absorb regenerated electric energy when capacitor C3 is charged to a voltage exceeding the d.c. supply voltage by a certain percentage, for example.

It is to be understood, of course, that some other current sensor arrangement could be used to perform a function like that of inductor winding L4. Also, a voltage proportional to or otherwise representative of the voltage across capacitor C3 could be provided for control purposes could be provided by means associated with the inverter output or with the motor M or by means associated with C3 in a manner different from the arrangement of FIG. 6.

There are also a number of ways in which some of the advantages of the invention may be utilized without using all the features above described. Reference has already been made to the use of independent inductors or even resistors in some application instead of the coupled inductor windings L1 and L2.

The complete flexibility provided by having each individual power pulse (except the one inserted if needed during the Y interval) initiated only if and when the condition of storage capacitor C3 calls for it can be sacrificed in part for possible economies in the control circuit by having the comparator 55 trigger a sequence of two pulses, consisting of one from each d.c. side of the FV thyristor bridge. In this case the period Y would be used merely for allowing completion of any such sequence of two pulses that may be under way (i.e., any new comparator pulses during the Y interval would simply be blocked, but it would not be necessary in this case to produce an extra pulse). In such an arrangement, however, the production of turn-off pulses for the AV bridge would have to involve inhibition not only of the turning on of more than one thyristor of the FV bridge, as performed in FIG. 6F by one of the inputs of gates 81, 82 . . . 86, but also of the second pulse of the normal power pulse sequence (perhaps making it preferable to use separate circuitry for provision of the turn-off pulses for the AV thyristor bridge instead of making double use of the power pulse circuitry). It will therefore be seen that a variety of control circuits will satisfy the requirements of inverters of this invention.

For purposes of explaining the operation of inverters of this invention and defining the various stages of its action, the process of transferring energy from the d.c. supply to the storage capacitor C3 at the input of the AV thyristor bridge has been described as one of charging one pulsing capacitor (e.g. charging C2 through L1, etc.) while the other discharges. This is essentially what occurs when C3 has a negligibly low voltage across it. When C3 has a moderate or high voltage charge, however, then when C2 is charged up to the d.c. supply voltage, the negative terminal of C3 is at the voltage of the positive pole of the d.c. supply and the positive terminal of C3 is at a substantially more positive potential, so that C1, instead of being discharged or nearly so, has a "reverse" charge of voltage of the same magnitude as that across C3. The charge on C1 is a "reverse" charge in the sense that on the next power pulse C1 will be charged in the opposite sense, to a voltage equal to that of the d.c. supply. The first phase of such charging of C1 will then cancel the "reverse" charge just mentioned, while C2 discharges and, of course, when C2 has completely discharged its discharge current will be followed, without a break by a current flowing in the same sense, giving C2 in turn a "reverse" charge (as the result of C1 being charged up to a voltage equal to the d.c. supply voltage).

Briefly stated, then, the process which involves drawing current through L1 to charge C2 is described for simplicity as the charging of C2 and the discharging of C1. Likewise the process which involves drawing current through L2 to charge C1 is described for simplicity as the charging of C1 and the discharging of C2. In each case the neglect of the "reverse" charge is for purposes of brevity of expression, and the occurrence of such a "reverse" charge is to be understood.

It should be noted further that among the advantages of the inverter of FIGS. 2 or 3, is that either will supply the full rated output voltage to a fully loaded a.c. motor when the fixed voltage d.c. input voltage is below normal.

Another advantage of the inverter of FIGS. 2 or 3 is that either supplies an output voltage waveform low in ripple content regardless of the operating frequency and motor loading. Other advantages include: an inverter which has a fast response time; the elimination of the need for fast turn-off thyristors by providing a relatively long commutation time to the thyristors; and an inverter which provides a slow rate of rise of forward voltage ($dv/dt$) to all thyristors. Thus the inverter of this invention is reliable; capable of controlling an a.c. motor over a wide spread range (1–60 Herz or 90–120 Herz for special purpose application), and is low in cost.

The various gates and other active and reactive elements of the control circuit shown in FIG. 6 can in many cases be provided on multiple element integrated circuit chips, so that the control circuit, like the inverter circuit, can be provided in compact form, so that the costs are reasonable for individual controls for relatively small motors, for example for those on the order of 1 H.P. The operating principle of the inverter, described in connection with FIG. 2 and FIG. 5, is such as to call for power pulses only when they are needed and hence without the imposition of an elaborate pulse sequence within the steps of the inverter cycle as is the rule with pulse modulation systems heretofore used. Both the inverter and the control logic adjust to the effect of disturbances, because there are no elaborate fixed sequences within the steps of the cycle to be preserved and, finally, the inverter can recover from almost all temporary misfirings and short circuits and can react to prolonged short circuits without expensive protection systems.

Although one specific embodiment of the invention has been described in extensive detail, it will be understood that the scope of the invention, regardless of particularities shown by way of illustration, is to be understood from the claims.

What is claimed is:

1. A polyphase inverter of variable output voltage having a direct current input and a polyphase alternating current output and comprising, in combination:

a full voltage (FV) polyphase thyristor bridge connected to the poles of said direct current input respectively by non-capacitive impedances and with its a.c. side connected to said output terminals;

an adjustable voltage (AV) polyphase thyristor bridge connected to the poles of said direct current input respectively by two series capacitors, hereinafter referred to as pulsing capacitors, with its a.c. side likewise directly connected to said output terminals, and further having a storage capacitor connected across its d.c. input, in series with said pulsing capacitors;

diodes respectively connected in inverse polarity in parallel with each of the thyristors of said AV thyristor bridge; and control means adapted to provide a cyclical sequence of pulses for gating the respective thyristors of said AV bridge for inverting d.c. energy from said storage capacitor to polyphase a.c. energy at said output terminals and also adapted, at intervals determined by comparison of a voltage proportional to that across said storage capacitor with an adjustable reference voltage, to turn on alternatively thyristors of said FV bridge connected respectively to different output terminals and to different poles of said d.c. input, and thereby to charge one of said pulsing capacitors and then the other while concurrently causing the pulsing capacitor previously charged to discharge and to cause said storage capacitor to be charged when current, drawn through said inductor and a thyristor of said FV bridge as aforesaid, exceeds the requirements of a load connected to said output terminals, said control means being further adapted to turn on thyristors of said FV bridge at intervals and in sequence appropriate for turning off the respective thyristors of said AV bridge in said cyclical sequence.

2. A polyphase inverter as defined in claim 1 in which said non-capacitive impedances are provided by inductors.

3. A polyphase inverter as defined in claim 1 in which said non-capacitive impedances are provided by coupled inductor windings.

4. A polyphase inverter as defined in claim 3 in which clamping diode means are provided for preventing the voltage of said pulsing capacitors from exceeding that of the said d.c. input of the inverter.

5. A polyphase inverter as defined in claim 4 in which said clamping diode means includes two diodes, poled so as to be normally blocked by the voltage of said d.c. input of the inverter, cross connected respectively between the terminals of said storage capacitor and the opposite poles of said d.c. input.

6. A polyphase inverter as defined in claim 3 having, also, means for limiting the charging of said pulsing capacitors, said means being connected in parallel with said storage capacitor and consisting of a diode in series with an inductor winding coupled with said coupled inductor windings, said diode being poled to conduct current only when the voltage of said inductor winding exceeds, in the matching sense, the voltage across said storage capacitor.

7. A polyphase inverter as defined in claim 6 in which said inductor winding in series with said diode has substantially less turns than any of the other inductor windings coupled thereto.

8. A polyphase inverter as defined in claim 3 in which said control means is adapted to supplement each said turning on of a thyristor or thyristors of said FV bridge except said turnings on for turning off the respective thyristors of said AV bridge, by the subsequent turning on of an additional thyristor of said FV bridge connected to the same pole of said d.c. input as the thyristor or thyristors last previously turned on, thereby to assure substantially complete charging of said pulsing capacitors.

9. A polyphase inverter as defined in claim 8 in which said turning on of an additional thyristor is inhibited during operation of said inverter at relatively low output voltage.

10. A polyphase inverter as defined in claim 9 in which said control means are so arranged that said turning on of an additional thyristor is initiated by a signal produced by an additional winding coupled to said inductor windings but is not initiated when said signal occurs more than a predetermined time after the turning on of said thyristors last previously turned on.

11. A polyphase inverter as defined in claim 1 in which said voltage proportional to that across said storage capacitor for comparison with said reference voltage is produced by means of an isolating circuit comprising:
   a source of alternating current of multikiloherz frequency;
   a series resistor;
   a diode rectifying bridge;
   a detector circuit; and
   a transformer having a first and a second winding,
   said first winding being connected to said diode bridge and said diode bridge being connected also in series with said series resistor across said storage capacitor in such a way that current flowing through said series resistor reduces the impedance to alternating currents in said winding rectified by said diode bridge,
   said second winding being connected to said detector circuit and said source so that said source causes alternating current to be drawn through said second winding in partially alternate paths that combine to produce a rectified current in a common path portion.

12. A three-phase inverter of variable frequency and output voltage adapted for operation with a direct current input of substantially fixed voltage, said inverter comprising, in combination:
   a full voltage (FV) three phase thyristor bridge with its d.c. input connected to the poles of said fixed voltage direct current input respectively by two coupled inductor windings and with its a.c. side directly connected to the output terminals of the inverter;
   an adjustable voltage (AV) three phase thyristor bridge with its d.c. input connected to the poles of said fixed voltage direct current input respectively by two series capacitors, hereinafter referred to as pulsing capacitors, with its a.c. side likewise directly connected to said output terminals, and further having a storage capacitor, of much greater magnitude than that of said pulsing capacitors, connected across its said d.c. input, in series with said pulsing capacitors;
   diodes respectively connected in inverse polarity in parallel with each of the thyristors of said AV thyristor bridge;
   control means adapted to provide a cyclical sequence of pulses, variable in frequency by a frequency control, for gating the respective thyristors of said AV bridge for inverting d.c. energy from said storage capacitor to three phase a.c. energy at said output terminals and also adapted, at intervals determined by comparison of a voltage proportional to that across said storage capacitor with a voltage adjusted as a function of the position of said frequency control, to turn on alternately thyristors of said FV bridge identified as hereinafter set forth by reference to the progress of said cyclical pulse sequence, and thereby to charge one and then the other of said pulsing capacitors by current passing through one of said inductor windings and through a load connected to said output terminals and concurrently causing the other of said capacitors to discharge through the same path;
   said thyristors alternately turned on as aforesaid being, in terms of output terminal connections and polarity of d.c. connections, at certain times, including the first time in the pending step of said cyclical sequence, either or both of those corresponding to the two thyristors of the same d.c. side of said AV bridge which are gated on during the said step and at other times, in alternation with said certain times, the thyristor corresponding to the other thyristor of said AV bridge which is gated on during said step;
   said control means including means to turn on during the terminal portion of each step of said cyclical sequence the thyristor of said FV bridge corresponding as aforesaid to the thyristor of said AV bridge that completes with such step its third consecutive step of on-gating and to assure that, prior to said terminal portion, the last previous turning on of said alternately turned on thyristors of said FV bridge is one that turned on the thyristor of said FV bridge corresponding to the thyristor of said AV bridge which is the only one on its d.c. side of said AV bridge which is gated on during said step.

13. A three phase inverter as defined in claim 12 in which said control means includes pull-up means whereby, after each turning on of a thyristor or thyristors of said FV bridge in alternation as there stated, an additional thyristor of the same d.c. side of said FV bridge as that or those last previously turned on is turned on to assure relatively complete charging of the pulsing capacitors.

14. A three phase inverter as defined in claim 13 in which said control means includes means for disabling the operation of said pull-up means during operation of said inverter at low output voltage.

15. A three phase inverter as defined in claim 14 in which the said disabling means includes means for comparing a fixed interval with the time required for storage and subsequent release of energy by either of said inductor windings, said last mentioned means including an additional inductor winding coupled to said previously mentioned inductor windings.

16. A three phase inverter as defined in claim 12 in which the means last mentioned in said claim 12 is adapted to determine during an interval preceding said terminal portion of said step, whether for the stated function of said last mentioned means an additional turning on of a thyristor of said FV bridge, in said alternating turn on sequence, is necessary, and in the event of such necessity to turn on such thyristor, regardless of the state of said storage capacitor at that time.

17. A three phase inverter as defined in claim 16 in which said control means includes means whereby each turning on of a thyristor or thyristors of said FV bridge in alternation as aforesaid, including the turning on of a thyristor during said interval preceding said terminal portion of said step, is supplemented by the subsequent turning on of an additional thyristor of the same d.c. side of said FV bridge as that or those last previously turned on, in order to assure relatively complete charging of the pulsing capacitors.

18. A three phase inverter as defined in claim 17 in which said control means is adapted to turn on said additional thyristor by turning on all thyristors of its d.c. side of said FV bridge.

19. A three phase thyristor bridge as defined in claim 17 in which an additional inductor winding coupled with said inductor windings is provided and said control means includes means associated with said additional inductor winding for the preventing the turning on of said additional thyristor when the time required for storage and release of energy by one of said first mentioned inductor windings exceeds a predetermined interval.

20. A three phase inverter as defined in claim 19 in which the said means associated with said additional inductor windings is further adapted upon unusually long duration of continued energy storage said first mentioned inductor windings, to turn on all thyristors of said FV bridge.

21. A three phase inverter as defined in claim 20 in which the entire inverter is protected by a single fuse or other circuit breaker adapted to break circuit at thrice the maximum safe current of a thyristor of said inverter, of the lowest current rating used in the event thyristors of different current rating are used, and thus to break circuit within the time required for said thrice thyristor maximum current to build up in said first mentioned inductor windings.

22. A three phase inverter as defined in claim 13 in which said control means includes means for providing a minimum interval between said alternate turning on of thyristors of said FV bridge, whereby current of said inverter is limited to a nondestructive value in the event of a lockup in said AV bridge or in the event of a short circuit in a load or other connections to the inverter output.

23. A three phase inverter as defined in claim 22 in which means are further provided for increasing said minimum interval when the storage and consequent release of energy by said inductor windings takes longer than a predetermined time commensurate with said minimum interval.

24. A three phase inverter as defined in claim 13 in which there is provided clamping means comprising two diodes, poled so as to be normally blocked by the voltage of said fixed voltage direct current input, cross connected respectively between the terminals of said storage capacitor and the opposite poles of said direct current input.

25. A three phase inverter as defined in claim 12 having, also, means for limiting the charging of said pulsing capacitors, and means being connected in parallel with said storage capacitor and consisting of a diode in series with an inductor winding coupled with said coupled inductor windings, said diode being poled to conduct current only when the voltage of said inductor winding exceeds, in the matching sense, the voltage across said storage capacitor.

26. A three phase inverter of variable frequency and output voltage adapted for operation with a direct current input of substantially fixed voltage, said inverter comprising in combination:

a full voltage (FV) three phase thyristor bridge connected to the terminals of said direct current input respectively by two windings of an inductor and with its a.c. connections directly connected to the output terminals of the inverter;

an adjustable voltage (AV) three phase thyristor bridge reactively connected to said direct current input respectively by two series capacitors, hereinafter referred to as pulsing capacitors, and with its a.c. connections likewise connected to said output terminals and further having a storage capacitor, of much greater magnitude than that of said pulsing capacitors, connected across its d.c. input, in series with said pulsing capacitors;

diodes respectively connected in inverse polarity in parallel with each of the thyristors of said AV thyristor bridge;

control means for adjusting the output frequency and voltage adapted to gate the thyristors of said bridges in sequence according to the following table, in which Roman numerals indicate the sequence of steps (periods) established by commutation of said AV bridge, arabic numbers less than 10 indicate AV bridge thyristors, numbers higher than 10 indicate FV bridge thyristors, odd numbers identify thyristors connected to one side of d.c. bridge input and even numbers those connected to the other input side, thyristors designated by numbers differing by 10 being connected to the same output terminal, as are also the pairs designated by an odd number and the next higher integer, and in which table rows are designated by capital letters, the letter A designating continuous on-gating except for a brief turn-off time preceding the end of the sequence step, B and C designating on-gating for the entire sequence step, D designating turn on of an FV thyristor during the terminal interval of the step for turning off an AV thyristor, E and F designating momentary turn-on in alternation at intervals determined by output voltage adjustment and load requirements, except that the last such turn on before said terminal interval may be provided regardless of load requirements, E further designating the first turn on of an FV thyristor in said step and F further designating the last such turn on prior to said terminal interval, the double designation in row E signifying that either or both of the designated thyristors may be so turned on:

|   | I     | II    | III   | IV    | V     | VI    |
|---|-------|-------|-------|-------|-------|-------|
| A | 1     | 6     | 3     | 2     | 5     | 4     |
| B | 6     | 3     | 2     | 5     | 4     | 1     |
| C | 3     | 2     | 5     | 4     | 1     | 6     |
| D | 11    | 16    | 13    | 12    | 15    | 14    |
| E | 11,13 | 16,12 | 13,15 | 12,14 | 15,11 | 14,16 |
| F | 16    | 13    | 12    | 15    | 14    | 11    |

27. A three phase inverter as defined in claim 26 in which said control means is adapted to gate the thyristors of said bridges in sequence according to the following table, in which the Roman numerals and rows, A, B,C,D,E and F have the same significance as in claim 26 and in which row G indicates a thyristor turned on following every turning on, except in said terminal interval, of the thyristors designated by row E, and row H indicates a thyristor turned on following every turning on of the thyristor designated by row F, in each case when the inductor of said coupled windings has delivered all or almost all of the energy it had just stored:

|   | I     | II    | III   | IV    | V     | VI    |
|---|-------|-------|-------|-------|-------|-------|
| A | 1     | 6     | 3     | 2     | 5     | 4     |
| B | 6     | 3     | 2     | 5     | 4     | 1     |
| C | 3     | 2     | 5     | 4     | 1     | 6     |
| D | 11    | 16    | 13    | 12    | 15    | 14    |
| E | 11,13 | 16,12 | 13,15 | 12,14 | 15,11 | 14,16 |
| F | 16    | 13    | 12    | 15    | 14    | 11    |
| G | 15    | 14    | 11    | 16    | 13    | 12    |
| H | 12    | 15    | 14    | 11    | 16    | 13    |

28. A three phase inverter as defined in claim 27 in which said control means is adapted turn on thyristors as specified in rows G and H of the tabulation in said claim 27 only when the storing and release of energy by said inductor windings pursuant to turning on of thyristors designated respectively in row E or row F takes less than a predetermined period of time and in which turning on of said thyristors of said FV bridge is blocked during said predetermined period.

29. A three phase inverter as defined in claim 28 in which the time taken by the storage and release of energy by said inductor windings as aforesaid is determined by means of a sensing circuit including an additional inductor winding coupled to said first mentioned coupled inductor windings and in which said sensing circuit includes means for detecting abnormal duration of energy storage by said first mentioned inductor windings and, in response thereto, turning on all thyristors of said FV bridge and thereby relaxing the fusing or circuit breaker level and time requirements for protection of the inverter.

30. A three phase inverter as defined in claim 28 in which there is provided clamping means comprising two diodes, poled so as to be normally blocked by the voltage of said fixed voltage direct current input, cross connected respectively between the terminals of said storage capacitor and the opposite poles of said direct current input.

31. A three phase inverter as defined in claim 28 having, also, means for limiting the charing of said pulsing capacitors, and means being connected in parallel with said storage capacitor and consisting of a diode in series with an inductor winding coupled with said coupled inductor windings, said diode being poled to conduct current only when the voltage of said inductor winding exceeds, in the matching sense, the voltage across said storage capacitor.

32. A polyphase inverter of variable output voltage having a direct current input and a polyphase alternating current output and comprising, in combination:
   a full voltage (FV) polyphase thyristor bridge connected to the poles of said direct current input respectively by non-capacitive impedances and with its a.c. side connected to said output terminals;
   an adjustable voltage (AV) polyphase thyristor bridge connected to the poles of said direct current input respectively by two series capacitors, hereinafter referred to as pulsing capacitors, with its a.c. side likewise directly connected to said output terminals, and further having a storage capacitor connected across its d.c. input, in series with said pulsing capacitors;
   diodes respectively connected in inverse polarity in parallel with each of the thyristors of said AV thyristor bridge; and
   control means adapted to provide a cyclical sequence of pulses for gating the respective thyristors of said AV bridge for inverting d.c. energy from said storage capacitor to polyphase a.c. energy at said output terminals and also adapted to turn on alternately thyristors of said FV bridge connected respectively to different output terminals and to different poles of said d.c. input, and thereby to charge one of said pulsing capacitors and then the other while concurrently causing the pulsing capacitor previously charged to discharge and to cause said storage capacitor to be charged when current, drawn through said inductor and a thyristor of said FV bridge as aforesaid, exceeds the requirements of a load connected to said output terminals, said control means being further adapted to turn on thyristors of said FV bridge at intervals and in sequence appropriate for turning off the respective thyristors of said AV bridge in said cyclical sequence.

33. A polyphase inverter of variable output voltage having a direct current input and a polyphase alternating current output at its output terminals and comprising, in combination:
   a full voltage (FV) polyphase thyristor bridge connected to the poles of said direct current input respectively by non-capacitive impedances and with its a.c. side connected to said output terminals;
   an adjustable voltage (AV) polyphase thyristor bridge connected to the poles of said direct current input respectively by two series capacitors, with its a.c. side likewise directly connected to said output terminals, and further having a storage capacitor connected across its d.c. input in between said series capacitors; and
   control means adapted to provide pulses for the gating on and off of the respective thyristors of said bridges for inverting d.c. energy to polyphase variable voltage a.c. energy at said output terminals.

34. The method of inverting d.c. energy to variable voltage polyphase a.c. energy, for delivery to a load, from a d.c. supply, which method consists of:
   drawing current from said supply through an inductor winding, a first thyristor inverter bridge and said load to charge a pulsing capacitor and to increase the charge of a storage capacitor when current requirements of said load are exceeded, said current drawing being done alternately through different but coupled inductor windings to alternately charge different pulsing capacitors respectively connecting the poles of said supply to said storage capacitor;

inverting the d.c. energy stored in said storage capacitor by means of a second thyristor inverter bridge connected to the same output terminals as said first thyristor inverter bridge, and firing thyristors of said first thyristor bridge at times appropriate for turning off the thyristors of said second thyristor bridge.

35. A method as defined in claim 34 in which after each step of drawing current to increase the charge of said storage capacitor as aforesaid a supplemental pulse of current is drawn through the same inductor winding to complete the charge of the same pulsing capacitor without passing through said load by turning on another thyristor of said first thyristor bridge connected with said same inductor winding.

36. A method as defined in claim 34 in which a step of determining that the voltage across said storage capacitor is less than a reference voltage representative of said variable voltage preceds each step of drawing current to increase the charge of said storage capacitor.

* * * * *